Aug. 30, 1932.  W. A. VANOVER  1,875,308
FARMING IMPLEMENT
Filed Aug. 20, 1930  2 Sheets-Sheet 1
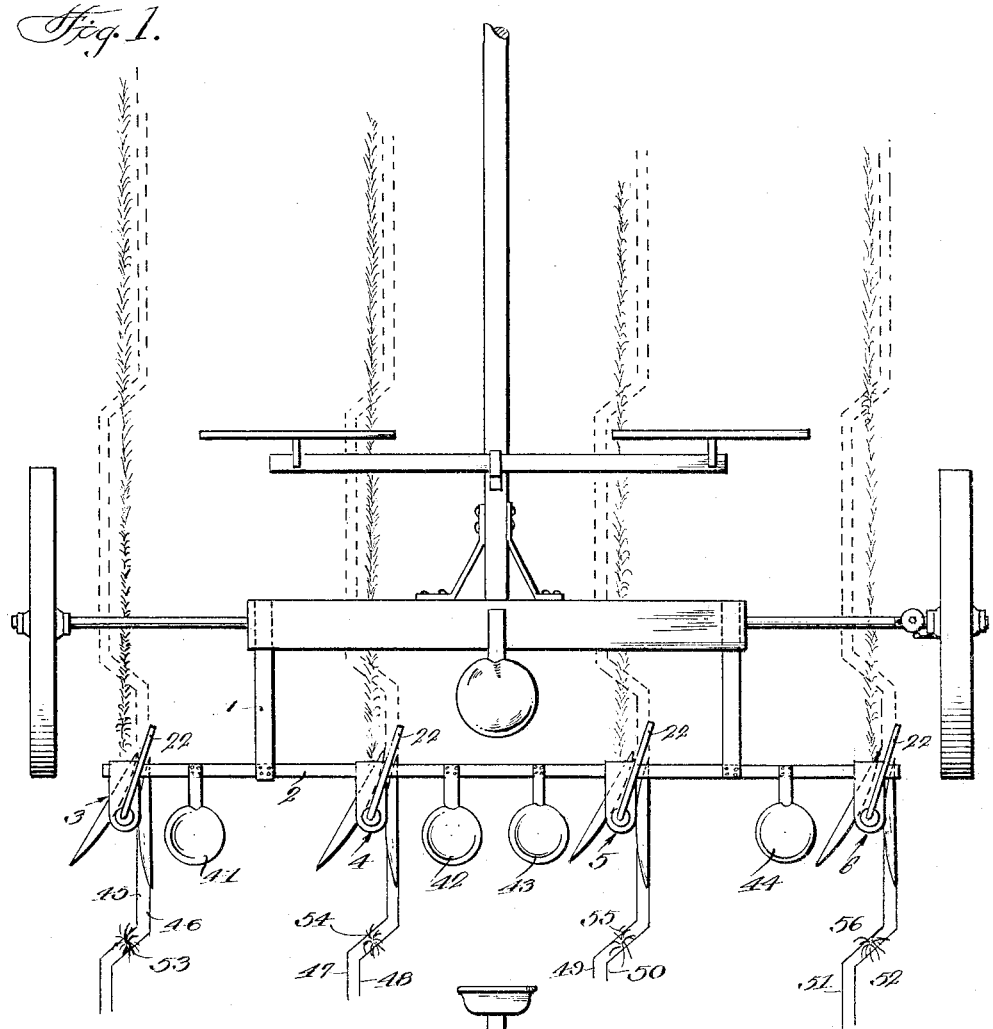
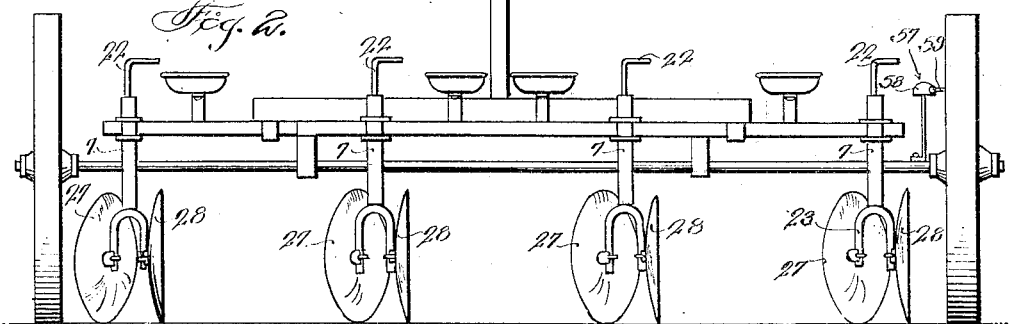

Aug. 30, 1932. W. A. VANOVER 1,875,308
FARMING IMPLEMENT
Filed Aug. 20, 1930 2 Sheets-Sheet 2
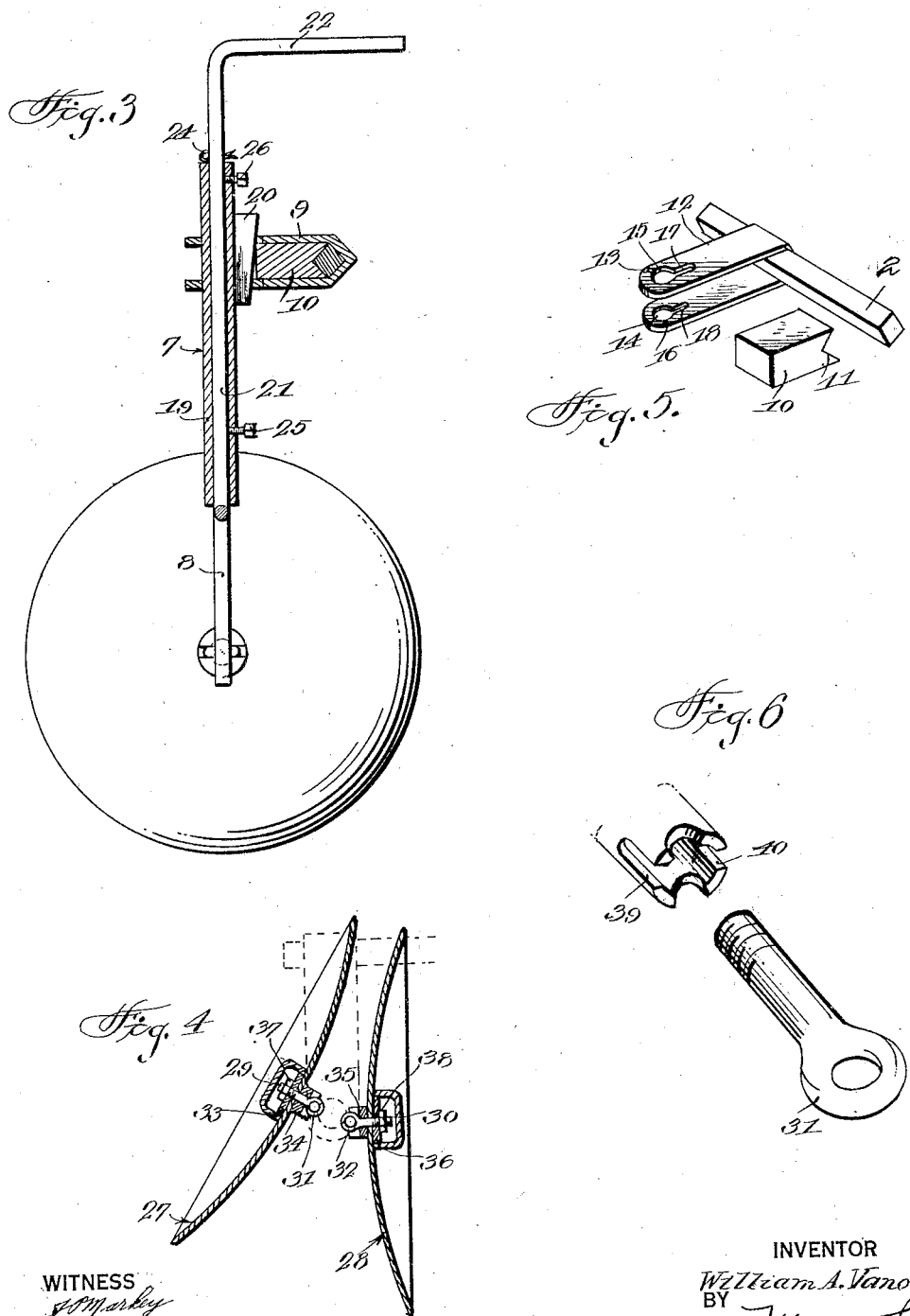
INVENTOR
William A. Vanover
BY
ATTORNEY Patented Aug. 30, 1932

1,875,308

UNITED STATES PATENT OFFICE

WILLIAM A. VANOVER, OF VALIER, MONTANA

FARMING IMPLEMENT

Application filed August 20, 1930. Serial No. 476,638.

My invention relates to farming implements, more particularly to farming implements for thinning and weeding sugar beets, peas, beans, lettuce and the like, and it consists in the constructions, combinations and arrangements herein shown and described.

The common practice among farmers for thinning rows of beets, lettuce, turnips, onions, carrots and the like is to cross block or take out portions of the rows of said beets and the like by driving an implement transversely of the rows to leave portions of the rows of beets and the like standing in clusters. This procedure, however, is inefficient when the rows of beets and the like do not have a uniform "stand", that is the plants in said row are not uniformly distributed throughout the length of said rows. In such cases the farmers must employ manual means for thinning the plants, usually resorting to a hoe or other manually operated implement for this purpose. It is a primary object of my invention, therefore, to provide an implement which will thin rows of plants such as sugar beets and the like according to the will of an operator, that is, enable said operator to select the portions of the rows which he wishes to thin, thereby permitting said operator to thin the rows most effectively in cases where the stand is not uniform and cross blocking might remove clusters and leave bare places in the row thus being ineffective for an efficient thinning operation.

It is also an object of my invention to provide such an implement as will enable the operator to accomplish the thinning operation with greater ease to himself than the manual means heretofore employed.

A still further object of my invention is to provide a device of the type described which will be readily adjustable for regulating the depth of a cut taken in the thinning or weeding operation.

A still further object of my invention is to provide a device of the type described which may be readily attachable to the frames or other portions of cultivators, small tractors, or other farm machines without great modification of said machines.

A further object of my invention is to provide a device of the character described which has few parts, is simple to manufacture and does not get out of order easily.

Other objects and advantages will appear as the specification proceeds and the invention will be more particularly defined in the appended claims.

My invention is illustrated in the accompanying drawings forming a part of this application, in which:

Figure 1 is a plan view of my invention;

Figure 2 is an elevational view of my invention;

Figure 3 is a sectional view of a portion of my invention.

Figure 4 is a sectional view of a portion of my invention with a part shown in phantom;

Figure 5 is a perspective detail assembly view of a portion of the device;

Figure 6 is a further perspective detail assembly view of a portion of the device.

In carrying out my invention I make use of a cultivator or other farm machine adapted to maintain a straight path in traversing the length of a row of plants such as the plants which my device is adapted to thin and weed. These machines are usually drawn by horses or tractors as desired. In this illustration I show a frame adapted to be horse drawn. These frames are usually constructed of rectilinearly formed bars, such as the bar 2 extending transversely across the rear thereof. It is to this bar that I fasten the operative parts of my invention.

In this embodiment I show four units 3, 4, 5 and 6 attached to the bar 2, each unit being adapted to perform a thinning and weeding operation for a single row. If desired, however, the number of units may be multiplied or reduced in number depending upon the frame or machine to which the units are attached, the proximity of the rows, or for various other reasons. It is understood that any number of units desired may be utilized within the scope of my invention, to match as many rows as planter will plant at once.

The units 3, 4, 5 and 6 are exactly similar in construction and a description of one will suffice for this application. Each unit consists of a frame, generally designated at 7 for mounting the device to the frame of the machine to which it is attached and an operating member 8 which performs the thinning operation.

For attaching this frame 7 to the bar 2 in this preferred embodiment I provide a bar clamping means, generally indicated at 9 and consisting of a block 10 having a bifurcated portion 11 for engagement with the rod 2 and a clamping strap 12 adapted to engage about the rod 2 for cooperation with the block 10 to perform the attaching operation. This clamping strap 12 is provided with a pair of alined bores 13 and 14 having enlarged portions 15 and 16 and reduced portions 17 and 18 respectively.

For securing the movable parts of my device in position for operation I provide the sleeve 19 which as will appear from an examination of Figure 3 is positioned in alined pairs 12 and 14 at the enlarged portions 15 and 16 respectively thereof and is secured in said bores by a wedge or other suitable retaining means, indicated at 20 and engageable between the block 10 and the sleeve 19 in the reduced portions 17 and 18 of the alined bores 13 and 14.

Rotatable within this sleeve 19 is a rod 21 having at its upper end a bent portion 22 to form a handle and at its lower end a fork 23. This rod 21 is secured against reciprocating movement relative to the sleeve 19 by means of the interengagement of the lower portion of the sleeve 19 and the fork 23 and the cotter key 24 or other suitable stop fixedly related to the rod 21 for engagement with the top of the sleeve 19.

For fixing the rod 21 against rotation relative to the sleeve 19 when desired, for cultivating, said sleeve is equipped with a pair of set screws 25 and 26 which screws engage through said sleeve and with the rod.

For performing the cutting operation to accomplish the thinning and weeding of the rows, the fork 23 is equipped on each tine thereof with a convexo-concaved disk 27, 28. These disks are secured on their respective tines by means of eye-bolts 29 and 30 respectively, which eye-bolts engage through apertures in the centers of said disk with the eyes 31 and 32 being engaged about their respective tines.

Engageable about the eye-bolts 29 and 30 for securing the disks in bearing relation for rotation relative thereto are the bearing sleeves 33, 34 and 35 and 36, respectively. These bearing sleeves are secured in position by nuts 37 and 38 on the end of the eye-bolts 29 and 30. The inner sleeves 34 and 35 are split, as indicated at 39 and 40 to engage the eye-portion 31 and 32 of the bolts 29 and 30 for prevention of rotation of said sleeve relative to said bolts. The bearings may be adjusted by means of the nuts 37 and 38. The eye-bolts 29 and 30 are secured on the tines of the fork 23 by tightening the nuts on the bolts. The disks 27 and 28 it will be noted from an examination of Figure 4 are set at an angle of approximately 30° although this angular relation of these disks may be varied to suit the individual needs and circumstances for a particular operation. The outer bearing (not shown) is riveted to disks and have a dust cap 38ª on the outer end.

For positioning an operator in proximity to the handle 22 of my device for the operation thereof, I provide adjacent each unit a seat such as those shown at 41, 42, 43 and 44 or provide a trailer-cart drawn closely behind.

If desired a signal means may be provided for indicating to the operators the time at which the disks are to be oscillated to thus bring about uniformity in the intervals at which the plants or clusters of plants are left standing in the row. I show such a signal system at 57 consisting of a bell 58 fastened to the axle of the farm machine and knockers 59 secured to the wheel for engagement with said bell upon each revolution of the wheel. Of course a plurality of knockers 59 may be provided on the wheel for engagement with the bell if short intervals are desired, or other suitable signal means may be utilized for this purpose.

From the foregoing description the use and operation of my invention is easily understood. The apparatus of my device is set up as heretofore described by engaging the clamping portions shown in Figure 5 with a suitably positioned bar such as the bar 2 on a cultivator or other machine adapted to maintain a desired path along a row of plants. Seats for the operator are also mounted as shown in Figure 1. The device is then set to make the desired cut by positioning the sleeve 19 in the clamping means 9 at the desired elevation and wedging the same home by means of the wedge 20. The clamping means 9 are so positioned on the frame 1 that the rod 21 is immediately above the row of plants, thus positioning the disks, in certain of the operative positions, on either side of said row.

In making the first cultivation to perform the weeding or removal of extraneous growths along the side of the row, the operator tightens the set screws 25 and 26 and positions the rod 21 in the sleeve 10 so that the disks 27 and 28 are placed on either side of the row and at equal angle therewith. He tightens the screws 25 and 26 to secure the disks in this position. The frame 1 is then set in motion by the horses or the tractor and the weeds are removed from either side of the row without the necessity of attention to my device by an operator.

In making the second cut to thin the plants as well as to remove weeds or growths therebetween, an operator, which may be a child, is placed in each of the seats 41, 42, 43 and 44 for control of the respective units 3, 4, 5 or 6 adjacent that particular seat. The set screws are loosened from engagement with the rod 21 and the same is permitted to revolve in its sleeve 19. The frame 1 is then set into motion by the means above outlined along the rows.

During this movement the operators of the units for the respective rows oscillate the rods 21 by means of the handles 22 to the right and to the left, thus bringing the left or right disk into engagement with the plants in the row for removal thereof. While one of the disks is performing this removal operation, the other disk, it will be noted from an examination of Figure 1, is situated substantially parallel to the path of movement of the farm machine as well as the row, thus performing no cutting operation. When the disks are oscillated from the left, to the right, or vice versa, due to the space therebetween, a plant or plants are left standing in the row while the remaining plants adjacent the same are removed. Of course weeds may also be removed as desired. The paths taken by the disks during this operation are indicated at 45, 46, 47, 48, 49, 50, 51 and 52 in Figure 1 and it will be observed that at the turning points plants or clusters of plants 53, 54, 55 and 56 are left standing in the row while intermediate portions are cutaway.

In both of the above described operations duck feet or other suitable means may be utilized for pushing the dirt back about the plant left in the row.

The signal means, generally indicated at 57, will indicate to the operators during the above described operation the intervals at which the clusters or single plants are to be left if regulation of the intervals is desired.

It will thus be seen that I have provided a thinning and weeding farm implement that will enable an operator to easily and efficiently thin rows of plants in a manner most efficient for conservation of plants throughout the row, thus doing away with a great deal of manual work, and also saving a great amount of seed which great amount is necessary to secure rows of uniform stand when blocking operations are used.

It is also seen that I have provided a weeding and thinning implement which may be adjusted to fit the needs of an individual operation in an easy and efficient manner.

I claim:

1. In a plant thinner and weeder or the like, a frame adapted to be mounted on the cultivator or the like, an oscillating member positioned in said frame for oscillation by an operator, and means positioned at the lower extremity of said oscillating member for performing the cutting operation, said means consisting of spaced disks adapted to cut away certain of the plants when in one position and adapted to pass over certain other of the plants when in other operative positions.

2. In a plant thinner and weeder or the like, means for thinning and weeding rows of plants and the like comprising a pair of spaced disks adapted to be positioned over the row of plants, means for oscillating said disks and means for mounting said disks to the cultivator or the like for oscillation, said disks being adapted to engage certain of the plants when oscillated to right and left positions and to pass therebetween certain of the plants during the oscillating operation.

3. In a plant thinner and weeder or the like, a means for thinning and weeding rows of plants and the like comprising cutting means adapted to perform the cutting operation, a support for said cutting means, and a clamping means for securing said support to a portion of the frame or the like comprising a block adapted for engagement with a portion of the frame of the cultivator or the like, and a strap adapted for engagement about the frame and the block and said support for securing said parts in fixed relation.

4. In a plant thinner and weeder or the like, a means for thinning and weeding plants and the like comprising means for cutting away certain of the plants, a support for mounting said cutting means and clamping means for securing said support to the cultivator or the like comprising a block adapted for engagement with a portion of the frame of the cultivator or the like, a strap adapted for engagement about a portion of the frame with said block and about said support, said strap having apertures adjacent said support and a wedge for positioning in said aperture to engage said support, said block and said strap for securing said parts in fixed position.

5. In a plant thinner and weeder or the like, means for thinning and weeding rows of plants and the like comprising a pair of spaced disks positioned at an acute angle to one another with the apex of said angle toward the direction of motion of said disks, means for oscillating said disks to perform the cutting operation, and means for securing said disks to said cultivator or the like.

6. In a plant thinner or the like, disks for performing the thinning operation, a fork for mounting said disks for operations for performing cutting and non-cutting operations, and means for securing each of said disks to a tine of said fork comprising an eye-bolt having an eyelet for engagement with one of said tines and a portion for rotatably mounting the respective disk, bearings for said disk engageable about each of said eye-bolts and retaining means engaged with each of said eye-bolts for maintaining said parts in fixed position.

7. In a plant thinner and weeder or the like, disks for performing the thinning operation, a fork for oscillating said disks to operative and inoperative positions, and means for securing each of said disks to the tine of said fork comprising an eye-bolt engageable through said disk and having an eyelet for engagement with its respective tine, bearing sleeves for said disk positioned about said eye-bolt, one of said bearing sleeves being split to engage said eye-let for fixing said sleeve against rotation, and retaining means associated with said eye-bolt for securing said parts in position.

8. In a plant thinner and weeder or the like, a means for thinning plants and the like comprising plant cutters positioned on said cultivator for operation by operators to perform the cutting operation and signal means positioned on said cultivator or the like for indicating to said operator the desired cutting intervals.

WILLIAM A. VANOVER.